United States Patent
Meyerhofer et al.

(10) Patent No.: US 7,424,968 B2
(45) Date of Patent: Sep. 16, 2008

(54) METHOD AND APPARATUS FOR PUBLIC STREET PARKING USING RF AND RFID TECHNOLOGY

(75) Inventors: Eric Meyerhofer, Pasadena, CA (US); Elizabeth Vicens, Los Angeles, CA (US)

(73) Assignee: FutureLogic, Inc., Glendale, CA (US)

( * ) Notice: Subject to any disclaimer, the term of this patent is extended or adjusted under 35 U.S.C. 154(b) by 324 days.

(21) Appl. No.: 11/212,269

(22) Filed: Aug. 26, 2005

(65) Prior Publication Data

US 2006/0043176 A1    Mar. 2, 2006

Related U.S. Application Data

(60) Provisional application No. 60/604,994, filed on Aug. 27, 2004.

(51) Int. Cl.
| H04Q 5/22 | (2006.01) |
| G08B 13/14 | (2006.01) |
| G07B 15/00 | (2006.01) |
| G07B 15/02 | (2006.01) |
| G06F 17/00 | (2006.01) |
| G06F 5/00 | (2006.01) |
| G06K 19/00 | (2006.01) |
| B60Q 1/48 | (2006.01) |
| G08G 1/14 | (2006.01) |

(52) U.S. Cl. ............... 235/375; 235/378; 235/382; 235/384; 235/487; 705/13; 705/418; 340/572.1; 340/10.1; 340/932.2

(58) Field of Classification Search ............... 235/375, 235/382, 384, 487; 705/13, 418; 340/572.1, 340/10.1, 932.2, 10.4, 10.41
See application file for complete search history.

(56) References Cited

U.S. PATENT DOCUMENTS

| 4,379,334 A | * | 4/1983 | Feagins et al. ............ 705/418 |
| 5,190,319 A | * | 3/1993 | Sandler ................. 283/102 |
| 5,266,947 A | * | 11/1993 | Fujiwara et al. .......... 340/932.2 |
| 5,339,000 A | * | 8/1994 | Bashan et al. ........... 340/932.2 |
| 5,351,187 A | * | 9/1994 | Hassett ................ 705/13 |
| 5,504,314 A | * | 4/1996 | Farmont ............... 235/384 |
| 5,845,268 A | * | 12/1998 | Moore ................ 705/418 |

(Continued)

FOREIGN PATENT DOCUMENTS

WO    WO 2004055736 A1 *    7/2004

*Primary Examiner*—Daniel Walsh
(74) *Attorney, Agent, or Firm*—Fitzpatrick, Cella, Harper & Scinto

(57) ABSTRACT

Method and apparatus for monitoring and regulating public street parking using RF and RFID technology including: tracking expired parking tickets and illegally parked vehicles and identifying parked vehicles using parking ticket from another location. The apparatus includes a central server coupled to parking enforcement, EDI, one or more kiosks, and a plurality of portable or mobile RFID transceivers. Each kiosk includes a controller, RFID transceiver, printer, card reader, cash acceptor, camera, connection to sensor LAN, connection to RFID transceiver LAN, connection to EDI, connection to central server, cash return mechanism, and parking violation mechanism. The apparatus uses a plurality of RFID parking tickets, with each ticket having a unique RFID tag or chip. Users acquire and pay for the RFID parking tickets using the kiosks and place the RFID tickets on their cars while parked. The central server manages authentication and monitoring of the issued parking tickets using the RFID transceivers and cameras. The central server can contact a parking enforcement officer when a parking violation is detected.

20 Claims, 15 Drawing Sheets

U.S. PATENT DOCUMENTS

| | | | |
|---|---|---|---|
| 5,905,247 A * | 5/1999 | Ilen | 235/384 |
| 6,340,935 B1 * | 1/2002 | Hall | 340/932.2 |
| 6,344,806 B1 * | 2/2002 | Katz | 340/932.2 |
| 6,493,676 B1 * | 12/2002 | Levy | 705/13 |
| 6,559,776 B2 * | 5/2003 | Katz | 340/932.2 |
| 6,832,206 B1 * | 12/2004 | Chelnik | 705/13 |
| 7,019,670 B2 * | 3/2006 | Bahar | 340/932.2 |
| 7,026,954 B2 * | 4/2006 | Slemmer et al. | 340/932.2 |
| 7,104,447 B1 * | 9/2006 | Lopez et al. | 235/384 |
| 7,271,738 B2 * | 9/2007 | Berstis et al. | 340/932.2 |
| 2001/0013010 A1 * | 8/2001 | Ward, II et al. | 705/13 |
| 2002/0008639 A1 * | 1/2002 | Dee | 340/932.2 |
| 2002/0032601 A1 * | 3/2002 | Admasu et al. | 705/13 |
| 2002/0109610 A1 * | 8/2002 | Katz | 340/932.2 |
| 2002/0109611 A1 * | 8/2002 | Howard | 340/932.2 |
| 2002/0111851 A1 * | 8/2002 | Folkers | 705/13 |
| 2002/0128769 A1 * | 9/2002 | Der Ghazarian et al. | 701/207 |
| 2002/0163443 A1 * | 11/2002 | Stewart et al. | 340/932.2 |
| 2002/0190845 A1 * | 12/2002 | Moore | 340/10.3 |
| 2003/0010821 A1 * | 1/2003 | Silberberg | 235/382 |
| 2003/0132288 A1 * | 7/2003 | Fulcher et al. | 235/381 |
| 2003/0132840 A1 * | 7/2003 | Bahar | 340/541 |
| 2003/0144890 A1 * | 7/2003 | Dan | 705/5 |
| 2003/0146852 A1 * | 8/2003 | O'Dell | 340/932.2 |
| 2003/0222792 A1 * | 12/2003 | Berman et al. | 340/932.2 |
| 2003/0227827 A1 * | 12/2003 | Elizalde et al. | 368/109 |
| 2004/0181496 A1 * | 9/2004 | Odinotski et al. | 705/418 |
| 2004/0252034 A1 * | 12/2004 | Slemmer et al. | 340/932.2 |
| 2005/0010478 A1 * | 1/2005 | Gravelle | 705/16 |
| 2005/0015347 A1 * | 1/2005 | Mandy et al. | 705/67 |
| 2005/0033634 A1 * | 2/2005 | Pugliese, III | 705/13 |
| 2005/0068196 A1 * | 3/2005 | Marin | 340/932.2 |
| 2005/0088320 A1 * | 4/2005 | Kovach | 340/933 |
| 2005/0168352 A1 * | 8/2005 | Tomer | 340/932.2 |
| 2005/0190076 A1 * | 9/2005 | Howard et al. | 340/932.2 |
| 2005/0228583 A1 * | 10/2005 | Capuano | 701/207 |
| 2005/0280555 A1 * | 12/2005 | Warner | 340/932.2 |
| 2006/0043176 A1 * | 3/2006 | Meyerhofer et al. | 235/384 |
| 2006/0100921 A1 * | 5/2006 | Zanotti et al. | 705/13 |
| 2006/0129500 A1 * | 6/2006 | Mandy et al. | 705/65 |
| 2006/0136131 A1 * | 6/2006 | Dugan et al. | 701/300 |
| 2006/0152349 A1 * | 7/2006 | Ratnakar | 340/426.1 |
| 2006/0170566 A1 * | 8/2006 | Slemmer et al. | 340/932.2 |
| 2006/0187043 A1 * | 8/2006 | Allen | 340/572.1 |
| 2006/0212344 A1 * | 9/2006 | Marcus et al. | 705/13 |
| 2006/0227010 A1 * | 10/2006 | Berstis et al. | 340/932.2 |
| 2006/0253226 A1 * | 11/2006 | Mendelson | 701/1 |
| 2006/0255119 A1 * | 11/2006 | Marchasin et al. | 235/375 |
| 2006/0261938 A1 * | 11/2006 | Lai et al. | 340/505 |
| 2007/0029825 A1 * | 2/2007 | Franklin et al. | 293/128 |
| 2007/0112620 A1 * | 5/2007 | Johnson et al. | 705/13 |
| 2007/0129974 A1 * | 6/2007 | Chen et al. | 705/5 |
| 2007/0257818 A1 * | 11/2007 | Aubrey et al. | 340/932.2 |
| 2008/0024324 A1 * | 1/2008 | Adamczyk et al. | 340/932.2 |

* cited by examiner

METHOD AND APPARATUS FOR PUBLIC STREET PARKING USING RF AND RFID TECHNOLOGY

CROSS REFERENCE TO RELATED APPLICATION

This application claims the benefit of U.S. Provisional Patent Application No. 60/604,994, filed Aug. 27, 2004 which is hereby incorporated by reference as if set forth in full herein.

BACKGROUND OF THE INVENTION

1. Field of the Invention

This invention relates to public street parking and more specifically to using Radio Frequency (RF) and Radio Frequency IDentification (RFID) in monitoring and regulating public street parking, using RFID in issuing parking tickets purchased by individuals, and using RFID to identify parking tickets that have expired together with a vehicle parked in a public street parking space.

2. Background

The majority of municipalities use a coin meter for each parking space in public street parking. These coin meters are prone to theft and fraud, require personnel to remove the coins from each meter, and are usually limited to a time frame of 1 to 4 hours.

Currently, to legally park a vehicle in public street parking in many municipalities, an individual must insert coins or tokens into a coin meter located next to a public street parking space in which the individual's vehicle is parked after determining the length of time needed for parking. Municipalities must then rely on the honesty of individuals parking their vehicle in public street parking spaces as well as parking enforcement personnel to properly monitor public street parking and enforce the issuance of parking violation tickets.

A drawback of the present situation is that municipalities lose revenue each time another vehicle parks in a space where time is still available on a meter from a previously parked vehicle or a vehicle is parked in a space with an expired meter and an individual does not pay for parking. In addition, municipalities suffer a decrease in revenues due to the personnel requirements for meter maintenance, violation ticket issuance, and parking space expiration tracking.

An inconvenience to individuals with regard to the present situation is the need to have readily available coins or tokens to use in the coin meters for public street parking. Another disadvantage of the present situation is that if an individual wishes to park their vehicle for a length of time beyond the capabilities of most coin meters (usually 1 to 4 hours) currently in use, the individual must return to the coin meter and reinsert more coins or risk receiving a parking violation ticket.

SUMMARY OF THE INVENTION

This invention allows municipalities to increase revenues, decrease theft and fraud in revenue collection from existing metered parking equipment, and reduce the number of personnel needed for meter maintenance, parking violation ticket issuance, and parking space time monitoring/expiration tracking.

One solution to the present situation is to allow municipalities to issue RFID parking tickets for public street parking without a preset length of time, thereby allowing an individual to determine the amount of time they need for parking.

A municipality uses RF technology to issue an RFID parking ticket after an individual purchases an RFID parking ticket for public street parking. After purchasing the RFID parking ticket, the individual places the RFID parking ticket on the vehicle's dashboard near the windshield. A municipality then uses RF technology in conjunction with parking enforcement to monitor and regulate public street parking and parking ticket expiration.

Another solution to the present situation is for municipalities to replace a plurality of existing coin meters with a kiosk including the ways and means to accept cash, coins, Automated Teller Machine (ATM) cards, credit cards, or other Electronic Data Interchange (EDI). This method is beneficial to a municipality in that the municipality can capitalize on the reduction in personnel requirements, theft and fraud. An individual parking their vehicle also benefits with the convenience this invention offers.

In one aspect of the invention, a plurality of kiosks is placed in readily accessible locations on public streets. Each kiosk includes the ways and means to print and record the identity of a ticket containing an RFID chip when an individual purchases an RFID parking ticket, an RFID transceiver that interrogates each RFID parking ticket at a defined interval to verify the validity of each ticket, and a connection to a central server which includes the ways and means necessary to monitor the kiosks and track public parking activity.

In another aspect of the invention, each kiosk is coupled to a plurality of transceivers (exciters and receivers), each set of these is mounted to the curb, sidewalk, or a building in proximity to the public parking space in order to communicate with an RFID chip which could be present in the form of an RFID parking ticket.

In another aspect of the invention, a kiosk includes the ways and means to print and record the identity of an RFID parking ticket.

In another aspect of the invention, receiving a request by an individual and validating the purchase by means of EDI if the purchase was made using means other than cash, such as ATM or credit card.

In another aspect of the invention, a kiosk and associated Local Area Network (LAN) of transceivers interrogates each RFID parking ticket for validity. Each interrogation from a kiosk is performed at a defined interval such as every minute. If an expired RFID parking ticket is identified during the interrogation process, a kiosk having a connection to a central server, notifies the central server of the expiration of the RFID parking ticket and its approximate or specific location.

In another aspect of the invention, a central server having a connection to parking enforcement notifies parking enforcement to dispatch a parking enforcement officer to the location of the vehicle.

In another aspect of the invention, a central server includes the ways and means of storing and processing public parking information including parking violations and parking ticket expiration.

In another aspect of the invention, the identity on an RFID chip provides the identity of the ticket to a kiosk.

In another aspect of the invention, a kiosk links the identity of a ticket to a time frame.

In another aspect of the invention, a ticket is valid based on the purchase of a ticket.

In another aspect of the invention, a kiosk comprising the ways and means, along with its local area network of RFID transceivers, encodes information on an RFID chip as to the validity of the time frame associated with a ticket.

In another aspect of the invention, a kiosk encodes the location where a ticket was issued.

In another aspect of the invention, a kiosk includes the ways and means to accept credit, ATM or other EDI, create a ticket, and create a valid time period for each ticket ID.

In another aspect of the invention, a kiosk includes the ways and means to accept cash, create a ticket, and create a valid time period for each ticket ID.

In another aspect of the invention, a portable or mobile RFID transceiver interrogates each RFID parking ticket within physical proximity of the device for validity. The portable or mobile RFID transceiver determines the validity from information downloaded from a parking server at regular intervals.

In another aspect of the invention, a portable or mobile RFID transceiver reads the valid time period directly from the RFID chip on each ticket within the physical proximity of the device whereby the valid time period was encoded by a kiosk at the time of issuance.

In another aspect of the invention, each purchased RFID parking ticket is associated to a parking space number to prevent the reuse of the RFID parking ticket in a different parking space in another location in the same municipality.

In another aspect of the invention, the system issuing an RFID parking ticket associated to a parking space number includes the ways and means to void the previously purchased RFID parking ticket for the same parking space number.

In another aspect of the invention, a kiosk and an associated sensor network contains the ways and means to sense the existence of a vehicle in a parking space, and its RFID transceiver local area network interrogates for the existence of an RFID parking ticket located in a parked vehicle which is sensed to be present in a parking space to identify a parked vehicle not having a purchased RFID parking ticket. If a kiosk by this method identifies a parked vehicle not having a purchased RFID parking ticket, the kiosk having a connection to a central server, notifies the central server. The central server having a connection to parking enforcement notifies parking enforcement to dispatch a parking enforcement officer to the location of the vehicle.

In another aspect of the invention, the local area network used with a kiosk utilizes optical or proximity sensing to determine if a vehicle is parked in a particular space for which a kiosk is responsible.

In another aspect of the invention, the system containing a portable or mobile RFID transceiver which interrogates for an RFID parking ticket located in a parked vehicle in the portable or mobile unit's proximity, the vehicle which is sensed to be present in a parking space, to identify a parked vehicle not having a purchased RFID parking ticket.

In another aspect of the invention, cameras mounted throughout the municipality are used in conjunction with a kiosk and RFID transceivers to provide visual signals of illegally parked vehicles not having a purchased or valid RFID parking ticket.

In another aspect of the invention, a camera is located in a kiosk and used in conjunction with the kiosk and RFID transceivers to provide visual signals of illegally parked vehicles not having a purchased or valid RFID parking ticket.

In another aspect of the invention, a kiosk having an RFID transceiver interrogates each RFID parking ticket located in a parked vehicle to identify a vehicle having an RFID parking ticket purchased from another location within the municipality. If a kiosk by this method identifies such, the kiosk having a connection to a central server, notifies the central server. The central server having a connection to parking enforcement notifies parking enforcement to dispatch a parking enforcement officer to the location of the vehicle.

In another aspect of the invention, a portable or mobile RFID transceiver interrogates each RFID parking ticket located in a parked vehicle to identify a vehicle having an RFID parking ticket purchased from another location within the municipality.

In another aspect of the invention, a camera is located in each kiosk and used in conjunction with a kiosk and RFID transceivers to provide visual recording of vehicles having moved from a parking space after an expired RFID parking ticket was interrogated and identified, such that a photograph is taken of the vehicle's license plate.

In another aspect of the invention, cameras mounted throughout the municipality are used in conjunction with a kiosk and RFID transceivers to provide visual recording of vehicles having moved from a parking space after an expired RFID parking ticket was interrogated and identified, such that a photograph is taken of the vehicle's license plate.

In another aspect of the invention, a kiosk having a connection to a central server includes the ways and means to adjust and change the purchase price of a parking ticket.

In another aspect of the invention, a kiosk having a connection to a central server, the central server having a connection to parking enforcement, includes the ways and means to accept payment from an individual for a parking violation ticket.

In another aspect of the invention, a kiosk includes the ways and means to accept coins or tokens, create a ticket, and create a valid time period for each ticket ID.

In another aspect of the invention, the kiosk printing and issuing a ticket containing human readable information pertaining to the ticket such as validity time, date, cost, and location, the ticket also containing an RFID chip, the chip in said ticket containing an identification number related to the ticket.

In another aspect of the invention, the kiosk printing and issuing a ticket containing human readable information pertaining to the ticket such as validity time, date, cost, and location, the ticket also containing an RFID chip, the chip in the ticket being encoded with information by the kiosk containing an I.D., time validity period, and other information required to track the validity of said ticket over a time period and for a location.

BRIEF DESCRIPTION OF THE DRAWINGS

These and other features, aspects, and advantages of the present invention will become better understood with regard to the following description and accompanying drawings where.

DETAILED DESCRIPTION

Figure 1:
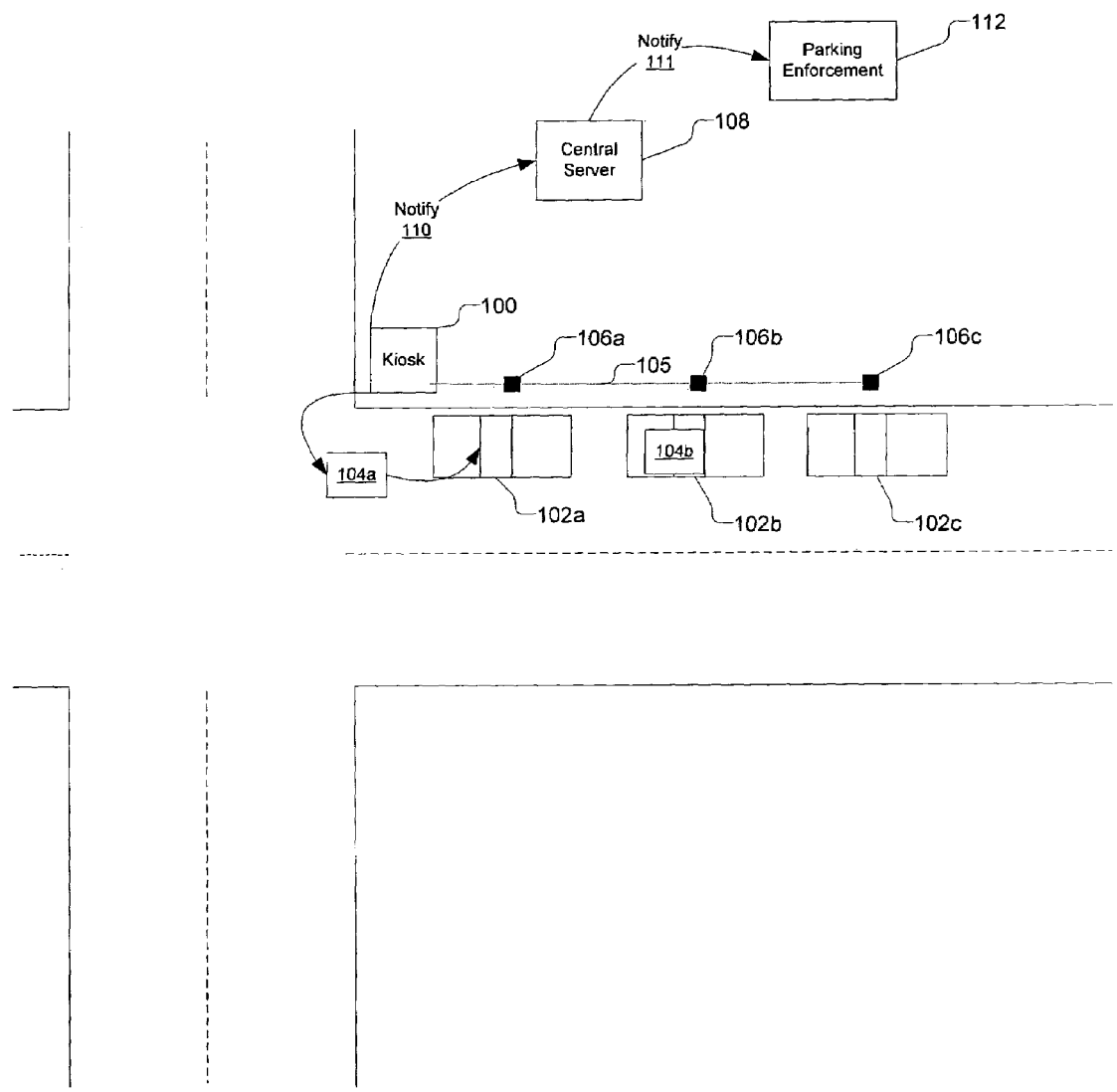
FIG. 1 is an illustration of a block of public street parking in a municipality including a kiosk and RFID transceivers in accordance with an exemplary embodiment of the present invention.

FIG. 1 is an illustration of a designated parking area, such as a block of public street parking, in a municipality including a kiosk and RFID transceivers in accordance with an exemplary embodiment of the present invention.

As shown in FIG. 1, a kiosk 100 is placed in a readily accessible location on a public street. When an individual parks a vehicle, such as vehicles 102a to 102c, in a public street parking space, the individual must purchase a parking ticket from the kiosk or risk receiving a parking violation ticket. After the individual purchases a parking ticket from the kiosk, the kiosk validates the purchase and prints an RFID parking ticket, such as parking tickets 104a and 104b. The individual returns to the vehicle and places the RFID parking ticket on the vehicle's dashboard near the windshield.

The kiosk is coupled through a wired or wireless local area network 105 to one or more RFID transceivers, such as RFID transceivers 106a to 106c, which are mounted to the curb, sidewalk, or a building in proximity to the public parking space to communicate with an RFID tag or chip which could be present in the form of an RFID parking ticket. The kiosk, components thereof, and associated RFID transceivers are used to interrogate each RFID parking ticket, such as parking tickets 104a and 104b, for validity. Each interrogation from the kiosk may be performed at a defined interval such as every minute, randomly or at the initiation of an event, such as arrival of a new vehicle or request from a parking enforcement official. If an expired RFID parking ticket, such as parking ticket 104b, is identified during the interrogation process, the kiosk having a connection to a central server 108, notifies (110) the central server of the expiration of the RFID parking ticket and its approximate or specific location. The central server, in turn, notifies (111) parking enforcement 112 to dispatch a parking enforcement officer to the location.

Figure 2:
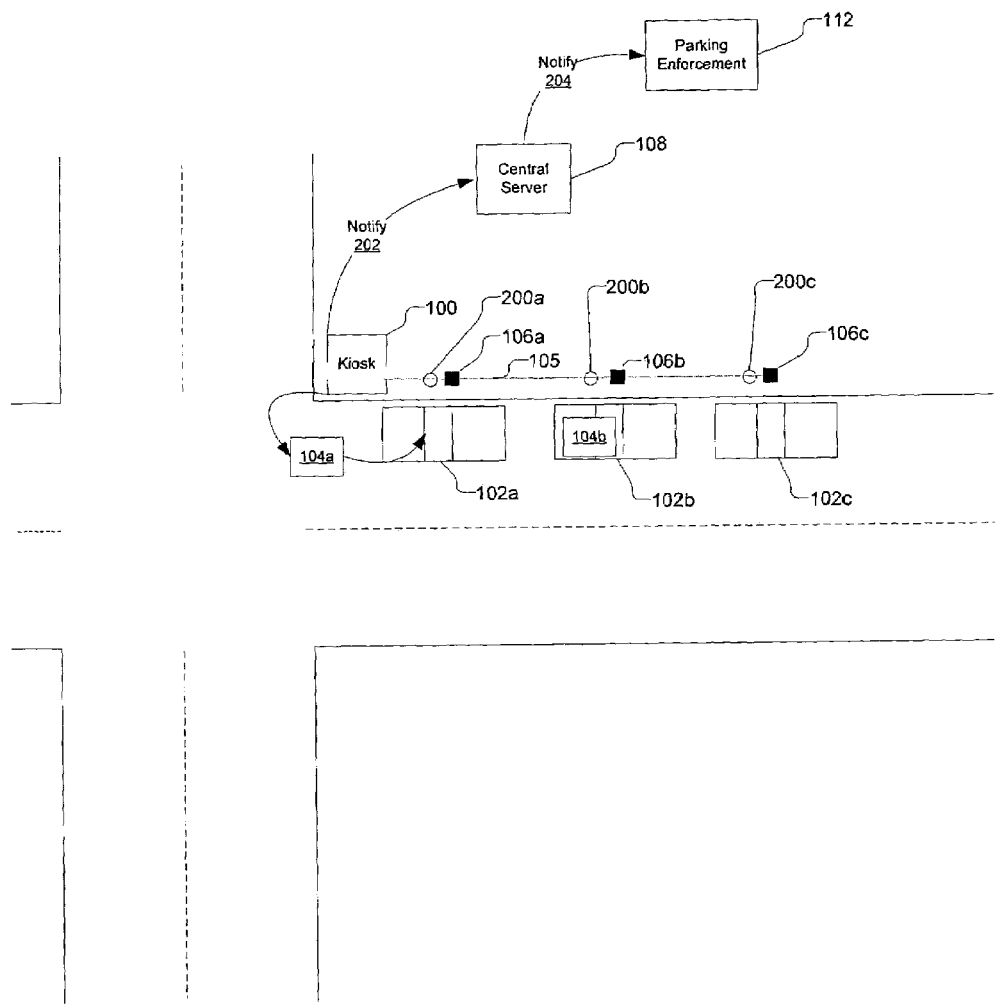
FIG. 2 is an illustration of a block of public street parking in a municipality including a kiosk, RFID transceivers, and vehicle present sensors in accordance with an exemplary embodiment of the present invention.

FIG. 2 is an illustration of a block of public street parking in a municipality including a:kiosk, RFID transceivers, and vehicle present sensors in accordance with an exemplary embodiment of the present invention.

As shown in FIG. 2, a kiosk 100 is placed in a readily accessible location on a public street. When an individual parks a vehicle, such as vehicles 102a to 102c, in a public street parking space, the individual must purchase a parking ticket from the kiosk or risk receiving a parking violation ticket. After the individual purchases a parking ticket from the kiosk, the kiosk validates the purchase and prints an RFID parking ticket, such as parking tickets 104a and 104b. The individual returns to the vehicle and places the RFID parking ticket on the vehicle's dashboard near the windshield.

The kiosk is coupled is coupled through local area network 105 to sensors, such as sensors 200a to 200c, which can be used to detect the presence of a vehicle, such as vehicles 102a to 102c, in a parking space. The kiosk, sensors, and RFID transceivers can be used to interrogate for the existence of an RFID parking ticket located in a parked vehicle, such as vehicle 102c, which is sensed to be present in a parking space to identify a parked vehicle not having a purchased RFID parking ticket. If the kiosk identifies a parked vehicle not having a purchased RFID parking ticket, the kiosk having a connection to a central server 108, notifies (202) the central server. The central server, in turn, notifies (204) parking enforcement 112 to dispatch a parking enforcement officer to the location.

In addition, the local area network and/or sensors used with the kiosk can be of an optical or proximity nature. The optical or proximity sensing is used to determine if a vehicle is parked in a particular space for which a kiosk is responsible.

Figure 3:
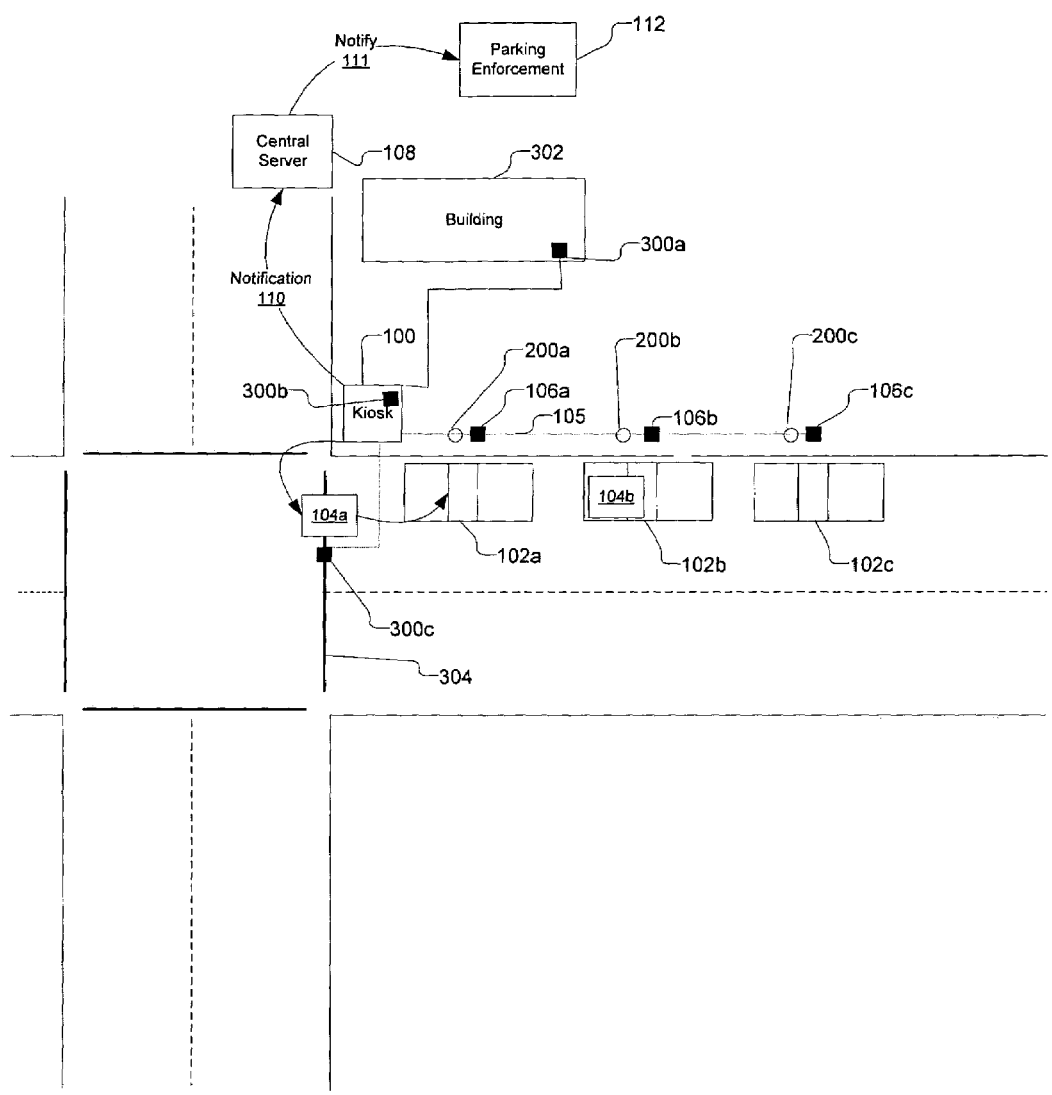
FIG. 3 is an illustration of a block of public street parking in a municipality including a kiosk, RFID transceivers, vehicle present sensors, and cameras in accordance with an exemplary embodiment of the present invention.

FIG. 3 is an illustration of a block of public street parking in a municipality including a kiosk, RFID transceivers, vehicle present sensors, and cameras in accordance with an exemplary embodiment of the present invention.

As shown in FIG. 3, a kiosk 100 is placed in a readily accessible location on a public street. When an individual parks a vehicle, such as vehicles 102a to 102c, in a public street parking space, the individual must purchase a parking ticket from the kiosk or risk receiving a parking violation ticket. After the individual purchases a parking ticket from the kiosk, the kiosk validates the purchase and prints an RFID parking ticket, such as parking tickets 104a and 104b. The individual returns to the vehicle and places the RFID parking ticket on the vehicle's dashboard near the windshield.

FIG. 3 also illustrates possible locations for one or more cameras, such as cameras 300a to 300c. These cameras are used in conjunction with the kiosk, RFID transceivers 106a to 106c, and sensors 200a to 200c to provide visual signals of illegally parked vehicles, such as vehicle 102c, not having a purchased or valid RFID parking ticket.

Cameras can also be used in one or multiple locations to provide visual recording of vehicles having moved from a parking space after an expired RFID parking ticket was interrogated and identified. In this example, the camera would take a photograph of the license plate of the vehicle.

As shown in FIG. 3, one possible location for a camera would be mounted to a building 302. Another possible location for a camera is within the kiosk 100. Yet another possible location for a camera is on the pole 304 which holds the signal lighting used to control an intersection.

The kiosk is coupled through local area network 105 to sensors 200a to 200c which can be used to detect the presence of a vehicle in a parking space. The kiosk, sensors, and RFID transceivers can be used to interrogate for the existence of an RFID parking ticket located in a parked vehicle which is sensed to be present in a parking space to identify a parked vehicle, such as vehicle 102c, not having a purchased RFID parking ticket. If the kiosk identifies a parked vehicle not having a purchased RFID parking ticket, the kiosk having a connection to a central server 108, notifies (110) the central server. The central server, in turn, notifies (111) parking enforcement 112 to dispatch a parking enforcement officer to the location.

The kiosk is coupled through local area network 105 to RFID transceivers which could be mounted to the curb, sidewalk, or a building in proximity to the public parking space to communicate with an RFID chip which could be present in the form of an RFID parking ticket. The kiosk, components thereof, and associated RFID transceivers are used to interrogate each RFID parking ticket for validity. Each interrogation from the kiosk is performed periodically, aperiodically or on the occurrence of an event. If an expired RFID parking ticket is identified during the interrogation process, the kiosk having a connection to a central server 108, notifies (110) the central server of the expiration of the RFID parking ticket and its approximate or specific location. The central server, in turn, notifies (111) parking enforcement 112 to dispatch a parking enforcement officer to the location.

Figure 4:
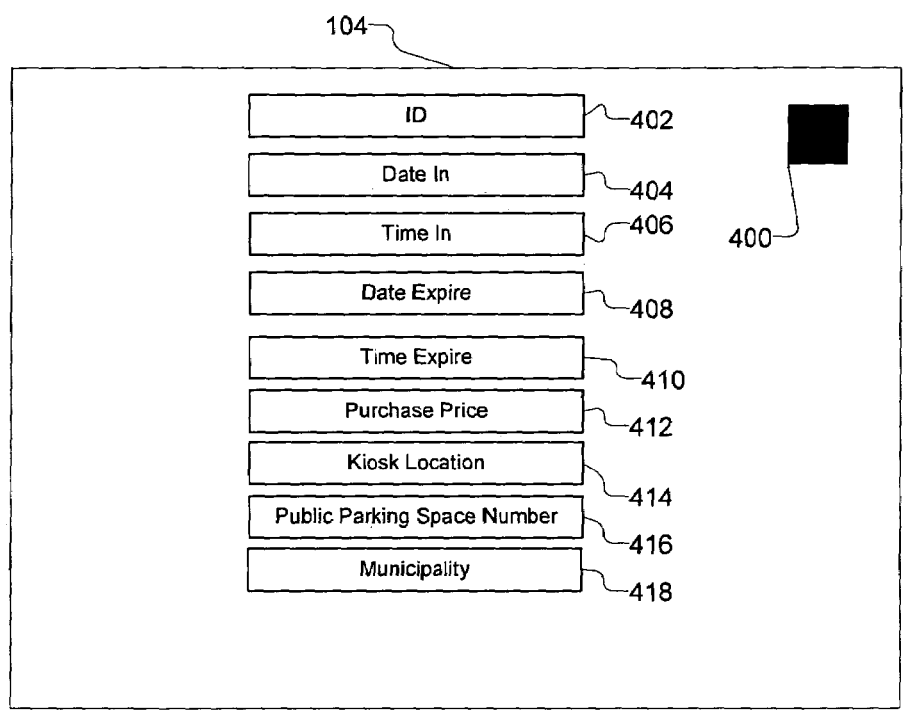
FIG. 4 is an illustration of an RFID parking ticket depicting logical fields in accordance with an exemplary embodiment of the present invention.

FIG. 4 is an illustration of an RFID parking ticket depicting logical fields in accordance with an exemplary embodiment of the present invention. Any field or a plurality of fields shown in FIG. 4 could be optional. Additional fields not currently identified may be included on the ticket.

As shown in FIG. 4, an RFID parking ticket 104 includes an RFID tag or chip 400 which provides a unique identity for the parking ticket. This RFID tag or chip could be located anywhere on the parking ticket. The RFID tag or chip is used by a kiosk to record the identity of an RFID parking ticket. Also encoded on an RFID tag or chip is information as to the validity of the time frame associated with a parking ticket by a kiosk comprising the ways and means, along with its local area network of RFID transceivers.

An ID field 402 on the RFID parking ticket provides human readable characters based on the contents of the RFID tag or chip.

A Date In field 404 on the RFID tag or chip is used to identify the date the ticket was purchased. A Time In field 406 is used to identify the time the ticket was purchased. A Date Expire field 408 is used to identify the date the ticket will expire. A Time Expire field 410 is used to identify the time the ticket will expire.

The Date In, Time In, Date Expire, and Time Expire fields are used by a kiosk to link the identity of a ticket to a time frame. These fields are also used during interrogation of an RFID parking ticket to verify the validity of the ticket. If an expired RFID parking ticket is identified during an interrogation process, a kiosk having a connection to a central server notifies the central server of the expiration of the RFID parking ticket. These fields used in conjunction with a Kiosk Location field 414, Public Parking Space Number field 416, and/or Municipality field 418 can be used to identify the approximate or specific location of the vehicle containing the expired RFID parking ticket.

A Purchase Price field 412 is used to identify how much an individual paid for the ticket.

The Kiosk Location field is used to identify the location of a kiosk within a municipality. The Kiosk Location field could also be used to encode the location where a ticket was issued.

The Public Parking Space Number field is used to uniquely identify a public parking space. The Public Parking Space Number field also could be used to associate the RFID parking ticket with a parking space number to prevent the reuse of the RFID parking ticket in a different parking space in another location in the same municipality. Additionally, this field can be used to void a previously purchased RFID parking ticket when another RFID parking ticket associated with a parking space number is purchased for the same parking space number.

The Municipality field could be used to identify the municipality in which a ticket is purchased.

The contents of any of these fields and/or others not currently identified could be recorded on the RFID tag or chip.

Figure 5:
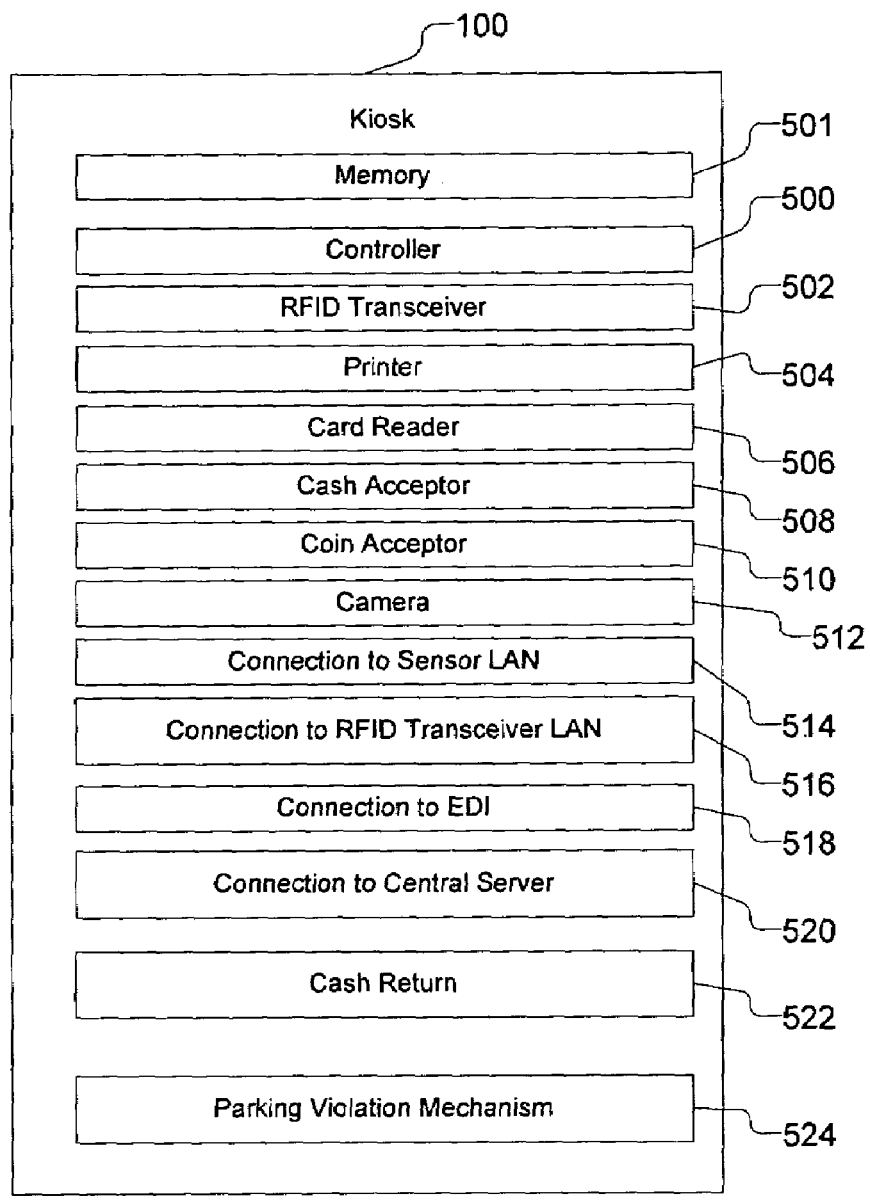
FIG. 5 is an illustration of a kiosk and components thereof in accordance with an exemplary embodiment of the present invention.

FIG. 5 is an illustration of a kiosk and components thereof in accordance with an exemplary embodiment of the present invention. A component or plurality of components shown in FIG. 5 could be optional.

As shown in FIG. 5, a kiosk 100 includes a controller 500 coupled to a memory 501 for storing data about issued parking tickets. The controller is further coupled to an RFID transceiver 502, a printer 504, a card reader 506, a cash or bill acceptor 508, a coin acceptor 510, a camera 512, a connection to a sensor LAN 514, a connection to an RFID transceiver LAN 516, a connection to EDI 518, a connection to a central server 520, a cash return mechanism 522, and a parking violation mechanism 524.

Also shown in FIG. 5 is the controller coupled to an RFID transceiver. During all interrogation processes the controller stores information gathered from the RFID transceiver.

The controller records the identity of a ticket containing an RFID tag or chip when an individual purchases an RFID parking ticket as shown and described in FIG. 4. The controller also enters data in each field of an RFID parking ticket. The controller also identifies expired RFID parking tickets during the interrogation process of RFID parking tickets. The controller also encodes information on an RFID chip as to the validity of a time frame associated with a ticket as well as encoding the location where a ticket was issued. The controller also defines the interrogation process for a defined interval such as every minute.

Alternatively, the controller records the identity a ticket containing an RFID tag or chip when an individual purchases the RFID parking ticket. The controller then enters data in each field of a data record corresponding to the data fields of FIG. 4 with the data record stored in the memory of the kiosk. The controller thus stores information about the RFID chip as to the validity of a time frame associated with the RFID parking ticket as well as storing the location where a ticket was issued.

The controller processes data received from the card reader.

Another component is the RFID transceiver which interrogates each RFID parking ticket to verify the validity of each ticket. The RFID transceiver when coupled with an associated local area network of RFID transceivers interrogates each RFID parking ticket for validity.

An RFID transceiver also interrogates for the existence of an RFID parking ticket located in a parking vehicle which is sensed to be present in a parking space. This interrogation process is to identify a parked vehicle not having a purchased RFID parking ticket.

An RFID transceiver also interrogates each RFID parking ticket located in a parked vehicle to identify a vehicle having an RFID parking ticket purchased from another location with the municipality.

Another component of a kiosk is a printer. The printer coupled with the controller prints an RFID parking ticket when an individual purchases an RFID parking ticket.

Another component of a kiosk is a card reader which is used to accept credit, ATM, or other EDI. The card reader reads and processes information when an individual requests to purchase an RFID parking ticket using means other than cash.

Another component of a kiosk is a cash acceptor which is used to accept the currency an individual inserts during the purchase of an RFID parking ticket. The cash acceptor when coupled with a cash return mechanism provides change when an individual inserts a larger denomination of currency than necessary for the purchase of an RFID parking ticket.

Another component of a kiosk is a coin acceptor which is used to accept the coins or tokens an individual inserts during the purchase of an RFID parking ticket. The coin acceptor when coupled with a cash return mechanism provides change when an individual inserts a larger denomination of coins or tokens than necessary for the purchase of an RFID parking ticket.

Another component of a kiosk is a camera. The camera when coupled with RFID transceivers provides visual signals of illegally parked vehicles not having a purchased or valid RFID parking ticket. The camera by this method also provides visual recording of vehicles having moved from a parking space after an expired RFID parking ticket was interrogated and identified; for example, by taking a photograph of the vehicle's license plate.

Another component of a kiosk is a connection to a sensor LAN. Sensors coupled to a sensor LAN identify the existence of a vehicles in parking spaces. Sensors coupled to the sensor LAN when coupled with the RFID transceiver LAN interrogate for the existence of an RFID parking ticket located in a parked vehicle which sensors coupled to the sensor LAN identify as being present. This interrogation identifies a parked vehicle not having a purchased RFID parking ticket.

The sensor LAN provides optical or proximity sensors for sensing to determine if a vehicle is parked in a particular space for which a kiosk is responsible.

Another component of a kiosk is a connection to an RFID transceiver LAN. The RFID transceivers coupled to this LAN interrogate RFID parking tickets to verify the validity or expiration of each ticket. The RFID transceivers when coupled to the RFID transceiver LAN to a sensor LAN identify a parked vehicle not having a purchased RFID parking ticket. The RFID transceivers by this method also identify a vehicle having an RFID parking ticket purchased from another location within the municipality or a different municipality.

A RFID transceiver when coupled with a camera identifies illegally parked vehicles not having a purchased or valid RFID parking ticket.

Another component of a kiosk is a connection to EDI where upon after receiving a request by an individual to purchase an RFID parking ticket, EDI processes and validates the purchase if the purchase was made using ATM, credit card, or other EDI.

The connection to EDI is coupled with a card reader where after ATM, credit card, or other EDI is inserted into a card reader, EDI processes and validates the purchase.

Another component of a kiosk is a connection to a central server, the central server comprising the ways and means necessary to monitor the kiosk and track public parking activity. Information such as expired RFID parking ticket notification, illegally parked vehicles not having a purchased RFID parking ticket, and vehicles having an RFID parking ticket purchased from another location is passed from a kiosk to a central server using the connection to a central server.

Another component of a kiosk is a cash return mechanism. The cash return mechanism when coupled with a cash acceptor dispenses change when an individual inserts a larger denomination of currency than necessary for the purchase of an RFID parking ticket.

The cash return mechanism when coupled to a coin acceptor provides change when an individual inserts a larger denomination of coins or tokens than necessary for the purchase of an RFID parking ticket.

Another component of a kiosk is a parking violation mechanism which includes the ways and means to accept payment from an individual for a parking violation ticket.

Figure 6:
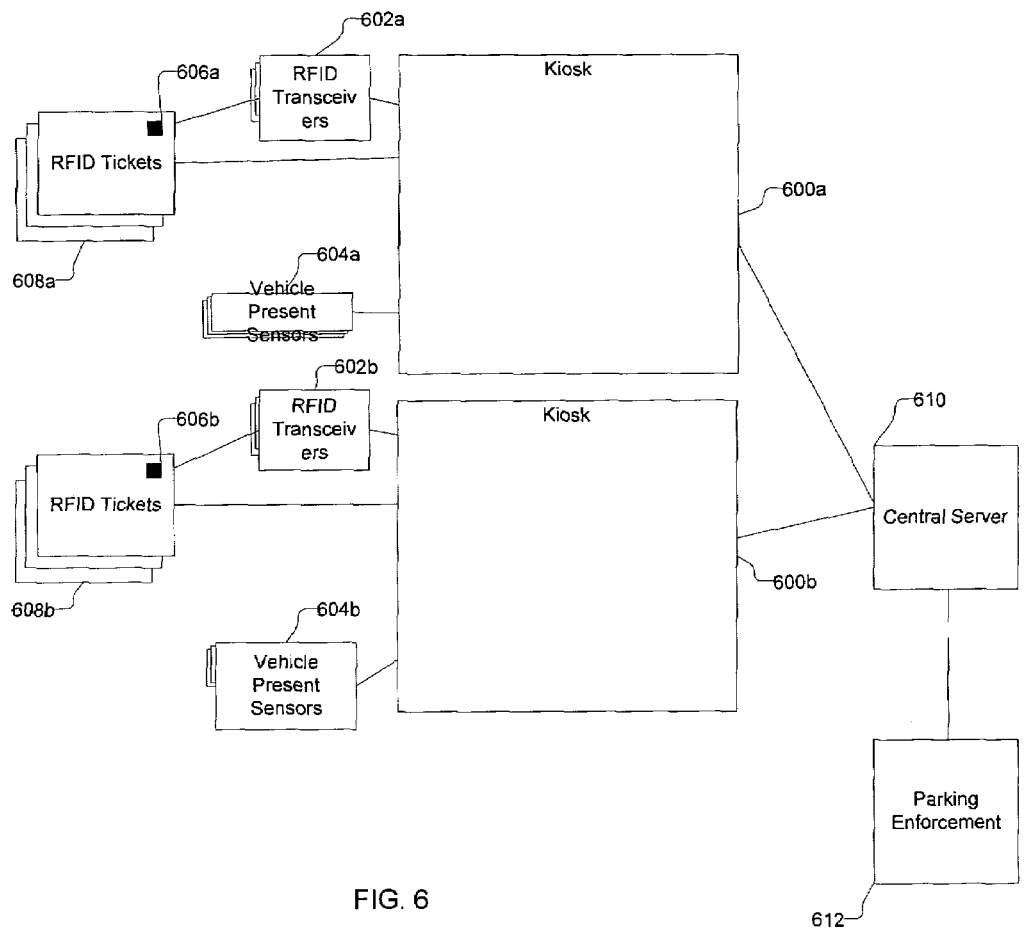
FIG. 6 is a diagram of a plurality of RFID parking tickets, a plurality of RFID transceivers, a plurality of kiosks, a plurality of vehicle present sensors, a central server, parking enforcement, and the relationship among these in accordance with an exemplary embodiment of the present invention.

FIG. 6 is a diagram of a plurality of RFID parking tickets, a plurality of RFID transceivers, a plurality of kiosks, a plurality of vehicle present sensors, a central server, parking enforcement, and the relationship among these in accordance with an exemplary embodiment of the present invention.

Each one of a plurality of kiosks, such as kiosks 600*a* and 600*b* (as fully described in FIG. 5) is coupled to one or more plurality of RFID transceivers, such as RFID transceivers 602*a* and 602*b*. Each RFID transceiver is mounted to the curb, sidewalk, or a building in proximity to the public parking space in order to communicate with RFID chips, such as RFID chips 606*a* and 606*b*, located in RFID parking tickets, such as 608*a* and 608*b* (which are more fully described in FIG. 4). A kiosk when coupled to a plurality of RFID transceivers interrogates each RFID parking ticket for validity or expiration.

Each kiosk as described in FIG. 5 may be further coupled to one or more sensors, such as sensors 604*a* and 604*b*, the sensors having the means and ways to detect the existence of a vehicle in a parking space.

Each kiosk is coupled to a central server 610 so that each kiosk may notify the central server of the expiration of an RFID parking ticket and its approximate or specific location. Notification of a vehicle not having a purchased RFID parking ticket and of a parked vehicle having an RFID parking ticket purchased from another location is also sent from a kiosk to the central server.

The central server is also coupled to parking enforcement 612. During one interrogation process, the central server notifies parking enforcement to dispatch a parking enforcement officer to the location of a vehicle having an expired RFID parking ticket. During another interrogation process, the central server notifies parking enforcement to dispatch a parking enforcement officer to the location of a vehicle not having an RFID parking ticket. During another interrogation, the central server notifies parking enforcement to dispatch a parking enforcement officer to the location of a vehicle having an RFID parking ticket purchased from another location.

Figure 7:
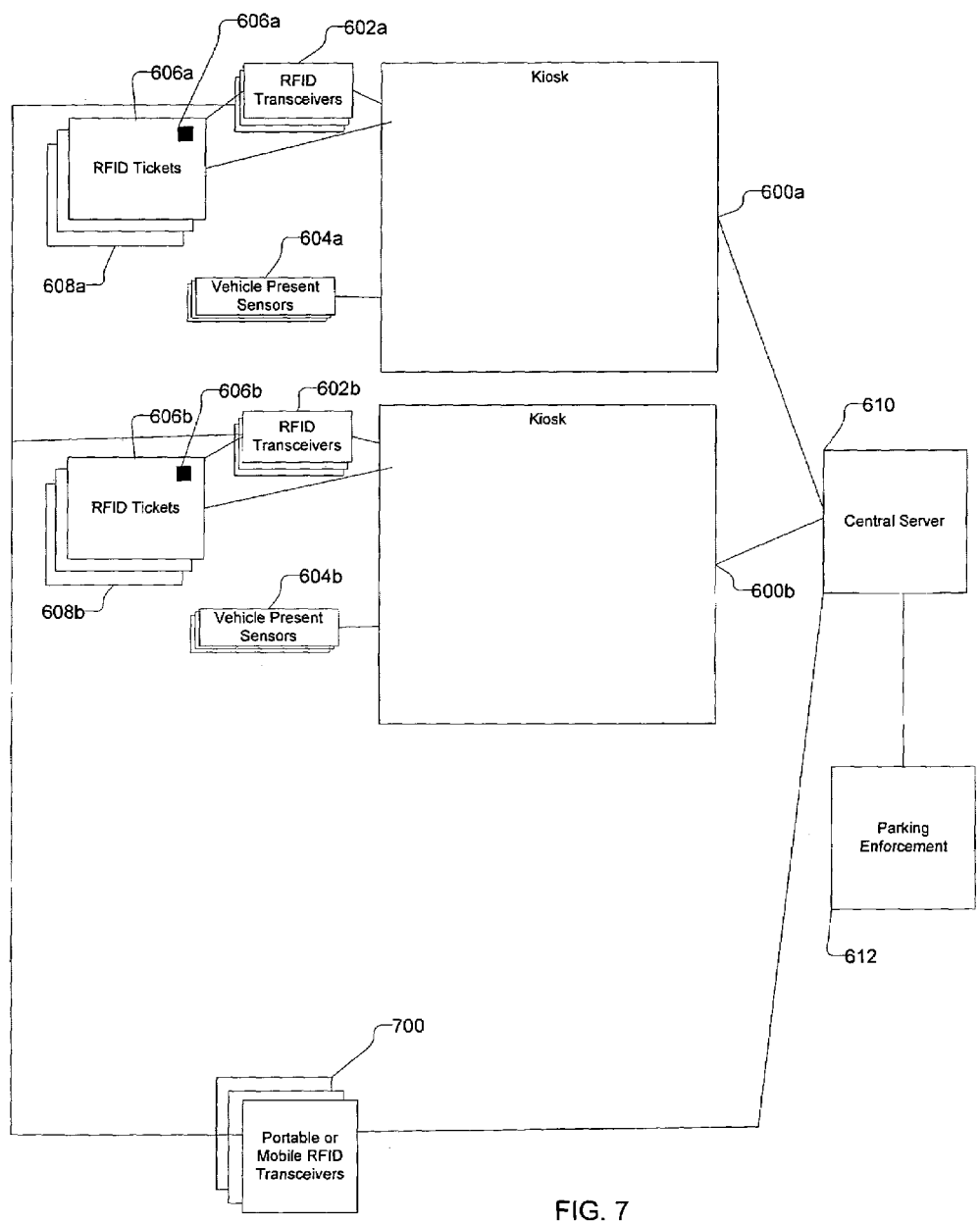
FIG. 7 is a diagram of a plurality of RFID parking tickets, a plurality of RFID transceivers, a plurality of kiosks, a plurality of vehicle present sensors, a central server, parking enforcement, a plurality of portable or mobile RFID transceivers, and the relationship among these in accordance with an exemplary embodiment of the present invention.

FIG. 7 is a diagram of a plurality of RFID parking tickets, a plurality of RFID transceivers, a plurality of kiosks, a plurality of vehicle present sensors, a central server, parking enforcement, a plurality of portable or mobile RFID transceivers, and the relationship among these in accordance with an exemplary embodiment of the present invention.

Each one of a plurality of kiosks, such as kiosks 600a and 600b (as fully described in FIG. 5) is coupled to one or more plurality of RFID transceivers, such as RFID transceivers 602a and 602b. Each RFID transceiver is mounted to the curb, sidewalk, or a building in proximity to the public parking space in order to communicate with RFID chips, such as RFID chips 606a and 606b, located in RFID parking tickets, such as 608a and 608b (which are more fully described in FIG. 4). A kiosk when coupled to a plurality of RFID transceivers interrogates each RFID parking ticket for validity or expiration.

Each kiosk as described in FIG. 5 may be further coupled to one or more sensors, such as sensors 604a and 604b, the sensors having the means and ways to detect the existence of a vehicle in a parking space.

Each kiosk is coupled to a central server 610 so that each kiosk may notify the central server of the expiration of an RFID parking ticket and its approximate or specific location. Notification of a vehicle not having a purchased RFID parking ticket and of a parked vehicle having an RFID parking ticket purchased from another location is also sent from a kiosk to the central server.

The central server is also coupled to parking enforcement 612. During one interrogation process, the central server notifies parking enforcement to dispatch a parking enforcement officer to the location of a vehicle having an expired RFID parking ticket. During another interrogation process, the central server notifies parking enforcement to dispatch a parking enforcement officer to the location of a vehicle not having an RFID parking ticket. During another interrogation, the central server notifies parking enforcement to dispatch a parking enforcement officer to the location of a vehicle having an RFID parking ticket purchased from another location.

As shown in FIG. 7, the central server may be further coupled to portable or mobile RFID transceivers 700 which are used to interrogate each RFID parking ticket for validity and expiration based on information downloaded from the central server. The portable or mobile RFID transceivers interrogate for expired RFID parking tickets, vehicles not having an RFID parking ticket, and vehicles having an RFID parking ticket purchased from another location.

A portable or mobile RFID transceiver reads the valid time period directly from the RFID tag or chip on each ticket whereby the valid time period was encoded by a kiosk at the time of issuance.

Figure 8:
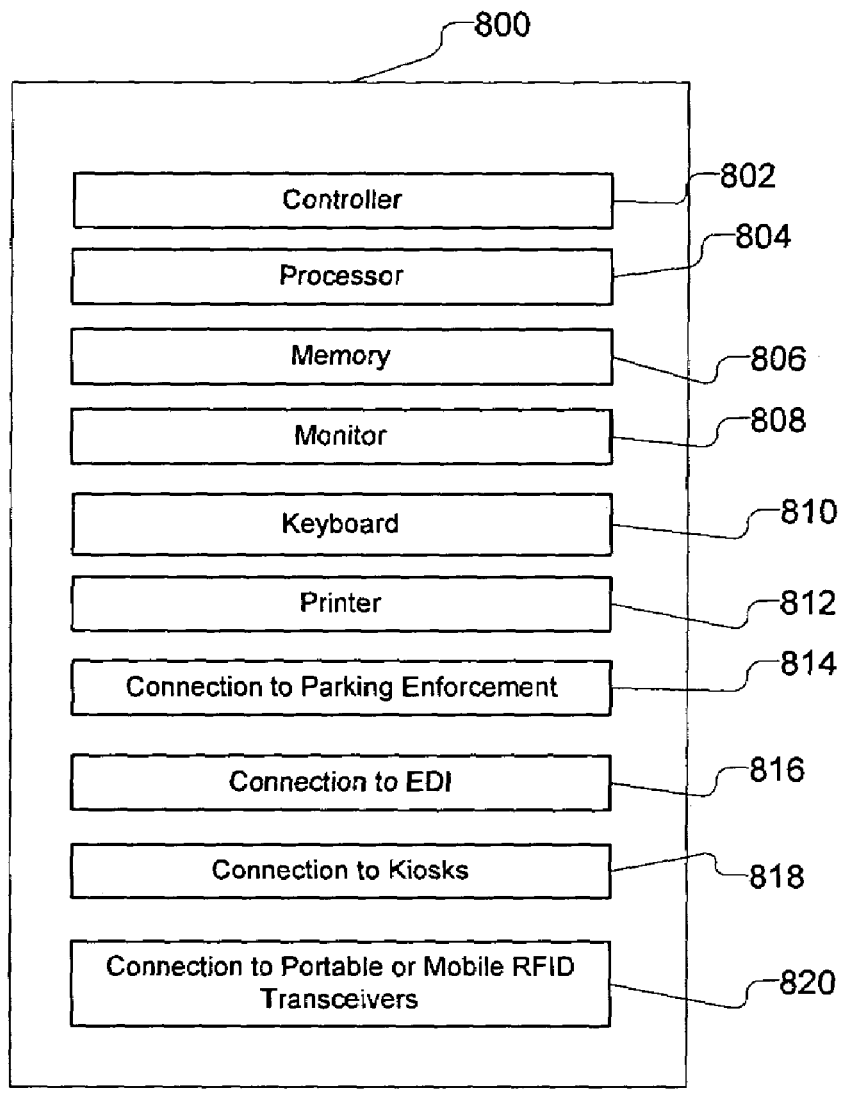
FIG. 8 is an illustration of a central server and components thereof in accordance with an exemplary embodiment of the present invention.

FIG. 8 is an illustration of a central server and components thereof in accordance with an exemplary embodiment of the present invention. A component or plurality of components shown in FIG. 8 could be optional.

As shown in FIG. 8, a central server 800 includes a controller. The controller 802 includes the ways and means to store and process public parking information including parking violations and parking ticket expiration.

A central server also includes a processor 804, a memory 806, a monitor 808, a keyboard 810, and a printer 812.

Another component of a central server is a connection 814 to parking enforcement whereby during an interrogation process, the central server-notifies parking enforcement to dispatch a parking enforcement officer if necessary.

Another component of a central server is a connection 816 to EDI.

Another component of a central server is a connection 818 to a plurality of kiosks as shown and described in FIG. 5.

The central server may further include a connection 820 to portable or mobile RFID transceivers.

Figure 9:
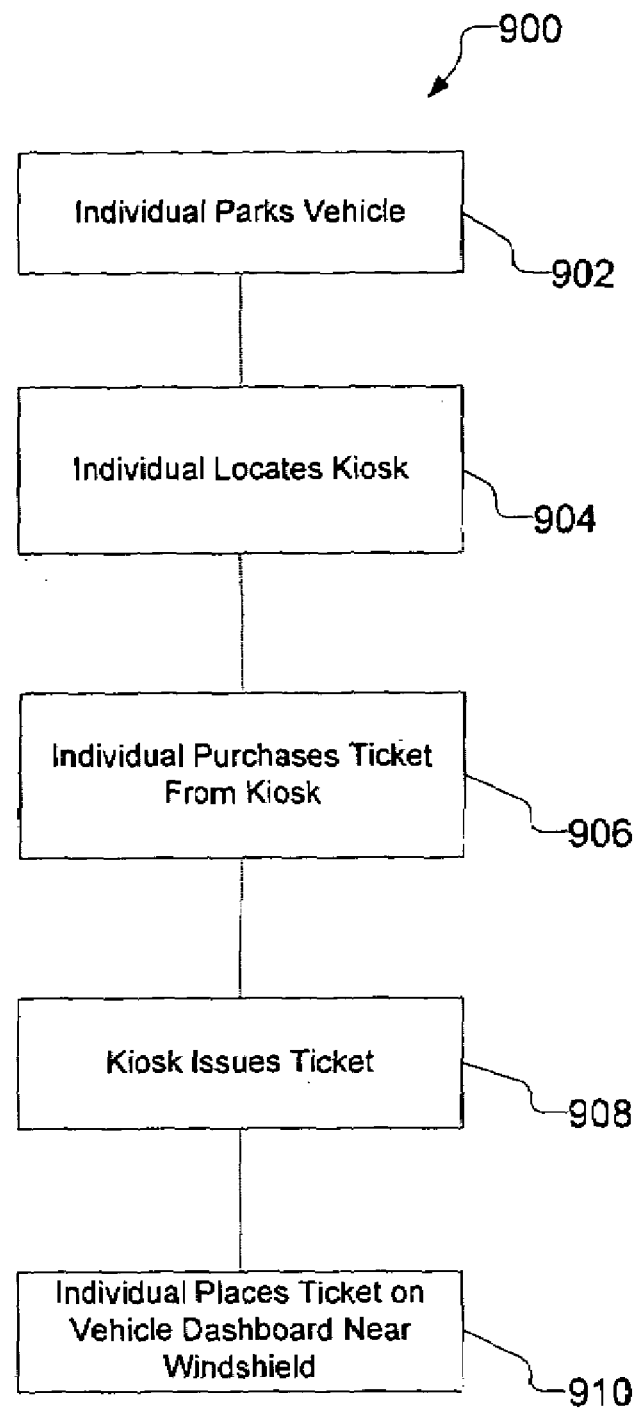
FIG. 9 is a process flow chart outlining the public street parking process in accordance with an exemplary embodiment of the present invention.

FIG. 9 is a process flow chart outlining a public street parking process 900 in accordance with an exemplary embodiment of the present invention.

As shown in FIG. 9, the process begins when an individual parks (902) a vehicle in a public parking space. The individual leaves the vehicle to locate (904) a kiosk as shown and described in FIG. 5. The individual then purchases (906) a ticket from the kiosk using cash, ATM, credit card, or other EDI instrument.

Thereafter, the kiosk issues (908) an RFID parking ticket as shown and described in FIG. 4. The individual then places (910) the RFID parking ticket on the vehicle's dashboard near the windshield.

Figure 10:
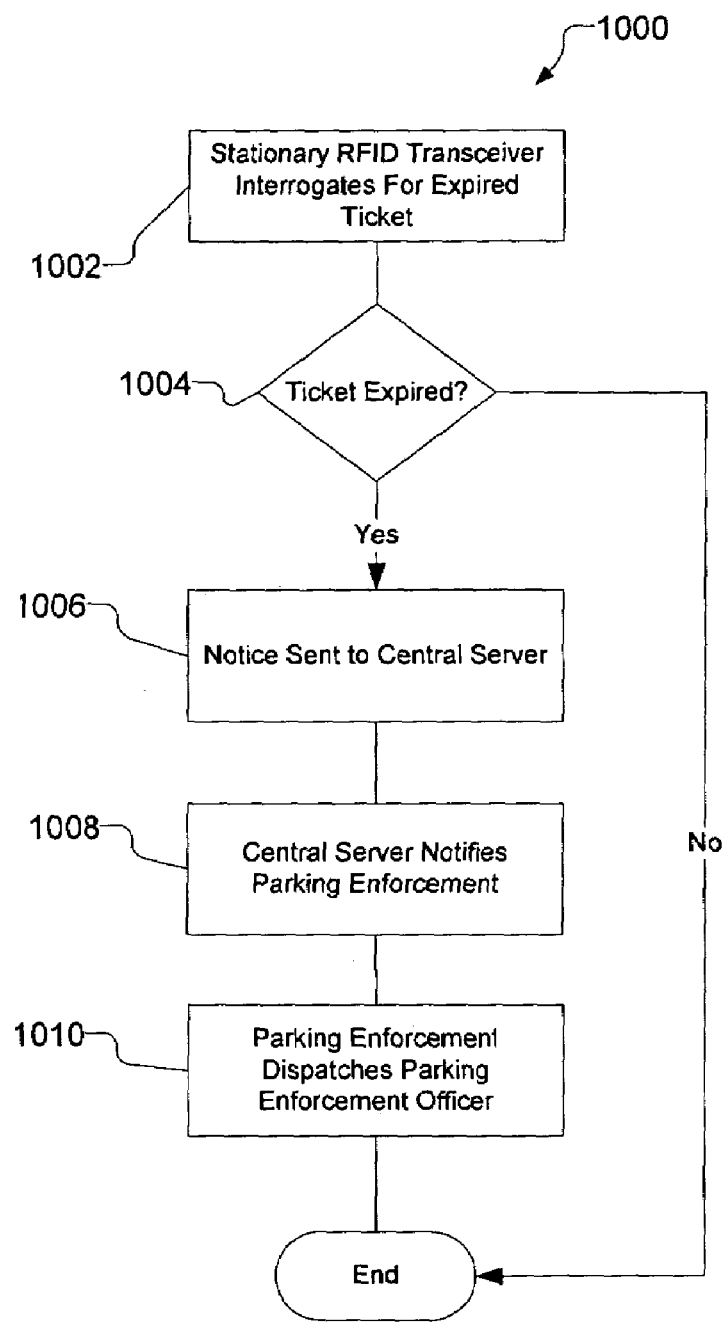
FIG. 10 is a process flow chart outlining how a stationary RFID transceiver interrogates for expired RFID tickets in accordance with an exemplary embodiment of the present invention.

FIG. 10 is a process flow chart outlining how a stationary RFID transceiver interrogates for expired RFID tickets in accordance with an exemplary embodiment of the present invention. Alternatively, a kiosk may use one or more RFID transceivers to perform the same process.

As shown in FIG. 10, the process 1000 begins with an RFID transceiver interrogating (1002) for an expired RFID parking ticket or a plurality of RFID parking tickets, an RFID parking ticket as shown and described in FIG. 4. If an expired RFID parking ticket or plurality of expired RFID parking tickets are identified (1004), a notice is sent (1006) to a central server. The central server, in turn, notifies (1008) parking enforcement. Parking enforcement then dispatches (1010) a parking enforcement officer.

Figure 11:
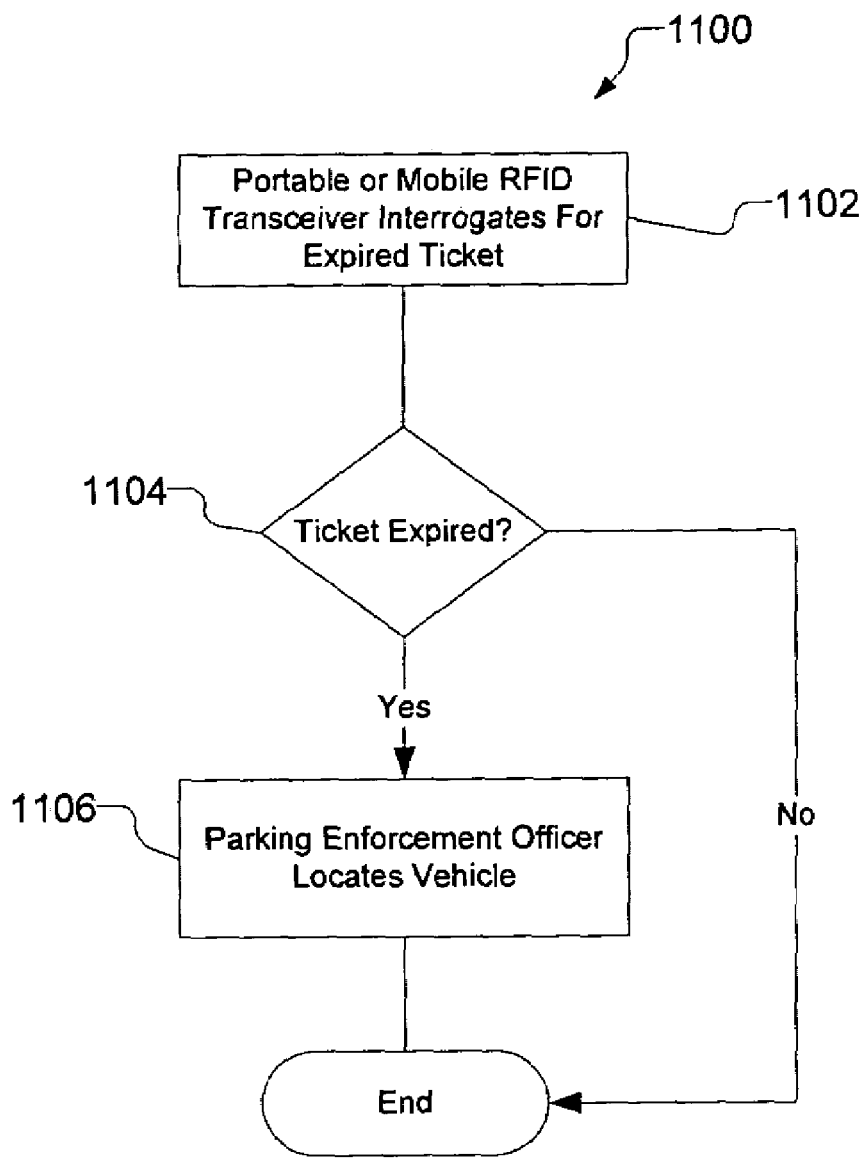
FIG. 11 is a process flow chart outlining how a portable or mobile RFID transceiver interrogates for expired RFID parking tickets in accordance with an exemplary embodiment of the present invention.

FIG. 11 is a process flow chart outlining how a portable or mobile RFID transceiver interrogates for expired RFID parking tickets in accordance with an exemplary embodiment of the present invention.

As shown in FIG. 11, the process 1100 begins with a portable or mobile RFID transceiver interrogating (1102) for an expired RFID parking ticket or a plurality of RFID parking tickets as shown and described in FIG. 4. If an expired RFID parking ticket or plurality of RFID parking tickets are identified (1104), a parking enforcement officer locates (1106) the vehicle having an expired RFID parking ticket.

Figure 12:
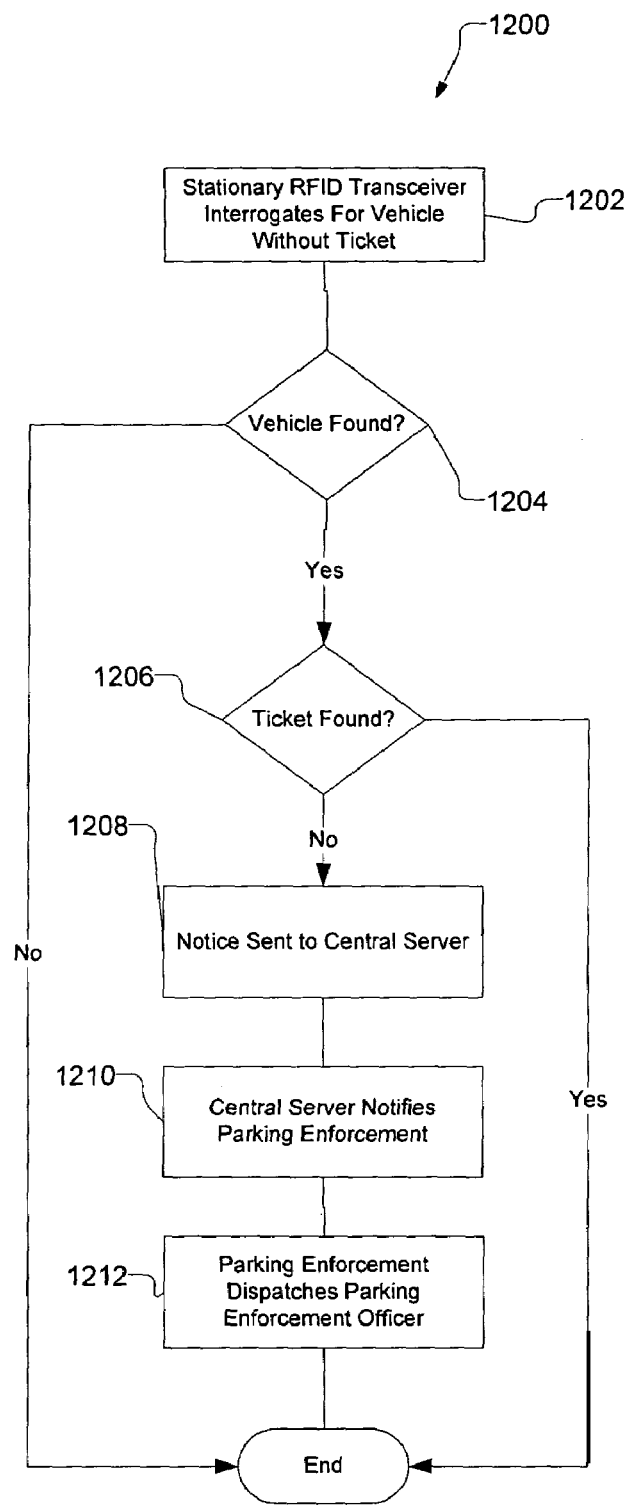
FIG. 12 is a process flow chart outlining how a stationary RFID transceiver interrogates for vehicles not having an RFID parking ticket in accordance with an exemplary embodiment of the present invention.

FIG. 12 is a process flow chart outlining how a stationary RFID transceiver interrogates for vehicles not having an RFID parking ticket in accordance with an exemplary embodiment of the present invention. Alternatively, the process may be used by a kiosk that is coupled to one or more RFID transceivers as previously described.

As shown in FIG. 12, the process 1200 begins with a stationary RFID transceiver using a parked vehicle sensor interrogating (1202) for vehicles present in a public parking space. If a vehicle is found (1204), the interrogation continues to identify (1206) a valid RFID parking ticket. If no ticket is found, a notice is sent (1208) to a central server. The central server, in turn, notifies (1210) parking enforcement. Parking enforcement then dispatches (1212) a parking enforcement officer. The parking enforcement officer locates the vehicle not having an RFID parking ticket.

Figure 13:
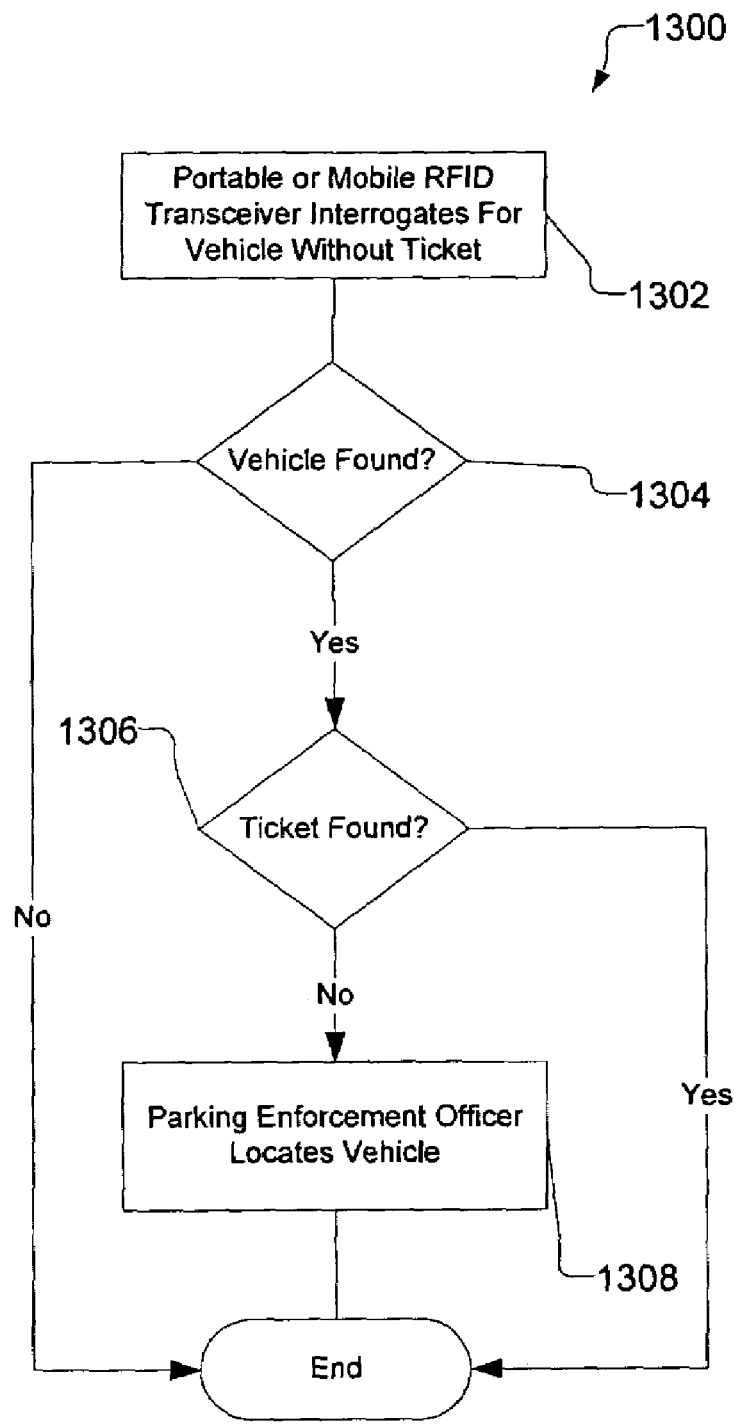
FIG. 13 is a process flow chart outlining how a portable or mobile RFID transceiver interrogates for vehicles not having an RFID parking ticket in accordance with an exemplary embodiment of the present invention.

FIG. 13 is a process flow chart outlining how a portable or mobile RFID transceiver interrogates for vehicles not having an RFID parking ticket in accordance with an exemplary embodiment of the present invention.

As shown in FIG. 13, the process 1300 begins with a portable or mobile RFID transceiver interrogating (1302) for vehicles present in a public parking space not having an RFID parking ticket as shown and described in FIG. 4. If a vehicle is found (1304), the interrogation continues to identify a valid RFID parking ticket. If no ticket is found (1306), a parking enforcement officer locates (1308) the vehicle not having an RFID parking ticket.

Figure 14:
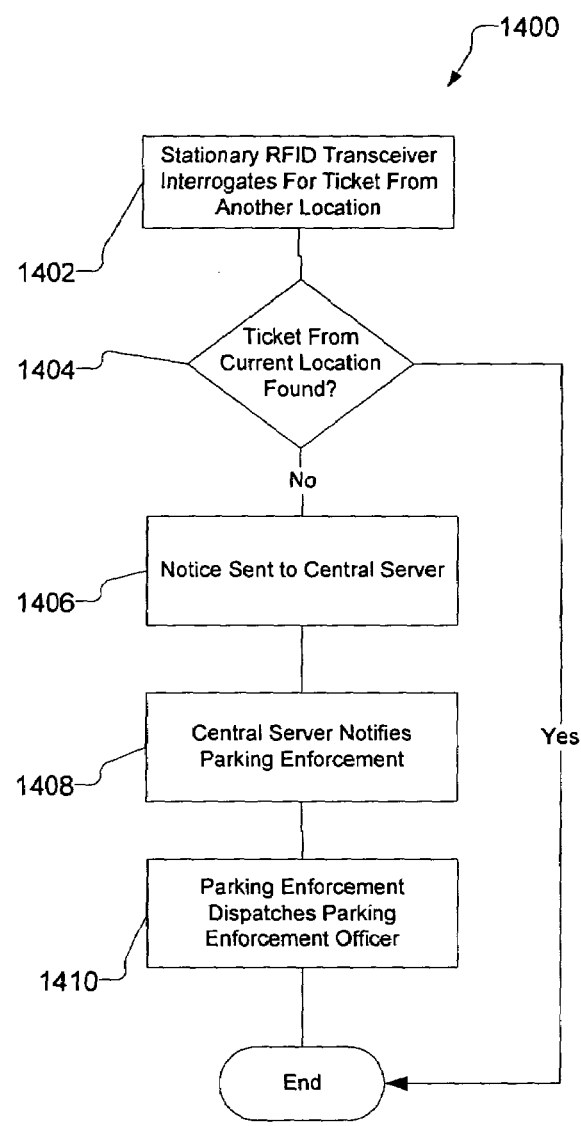
FIG. 14 is a process flow chart outlining how a stationary RFID transceiver interrogates for RFID parking tickets purchased from another location in accordance with an exemplary embodiment of the present invention.

FIG. 14 is a process flow chart outlining how a stationary RFID transceiver interrogates for RFID parking tickets purchased from another location in accordance with an exemplary embodiment of the present invention. Alternatively, the process may be employed by a kiosk coupled to one or more RFID transceivers as previously described.

As shown in FIG. 14, the process 1400 begins with a stationary RFID transceiver interrogating (1402) for RFID parking tickets purchased from another location, the RFID parking tickets as shown as described in FIG. 4. If a ticket from another location is identified (1404), a notice to sent (1406) to a central server. The central server, in turn, notifies (1408) parking enforcement. Parking enforcement then dispatches (1410) a parking enforcement officer. The parking enforcement officer locates the vehicle having an RFID parking ticket purchased from another location.

Figure 15:
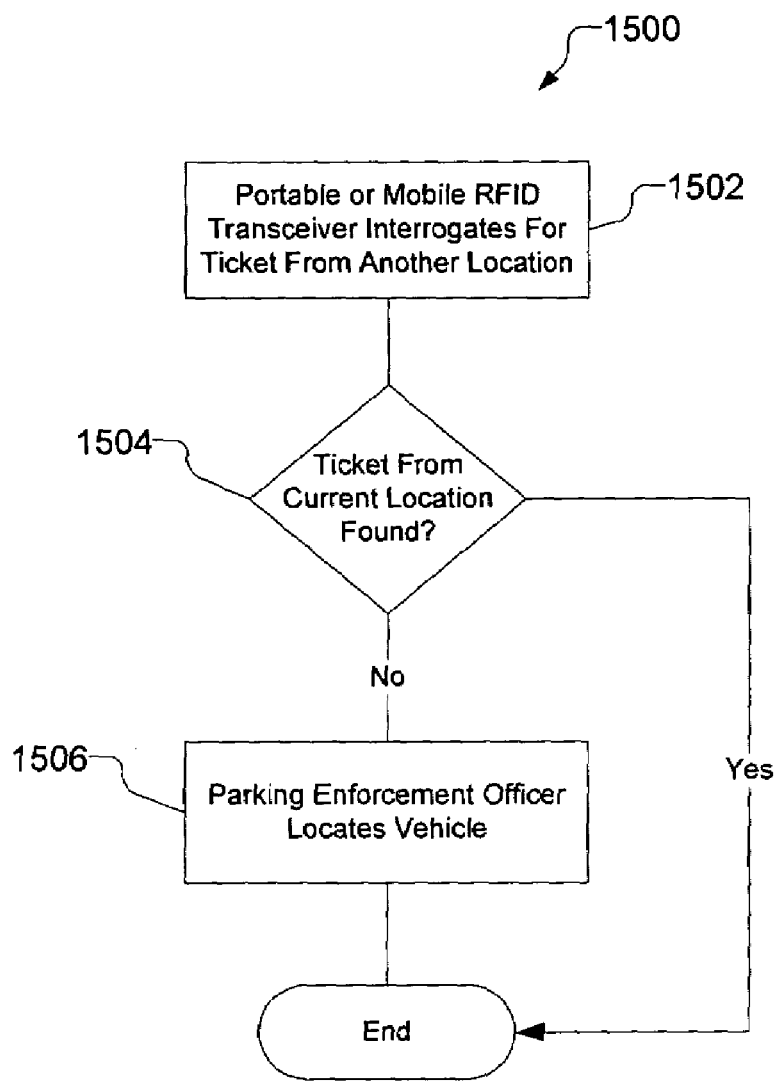
FIG. 15 is a process flow chart outlining how a portable or mobile RFID transceiver interrogates for RFID parking tickets purchased from another location in accordance with an exemplary embodiment of the present invention.

FIG. 15 is a process flow chart outlining how a portable or mobile RFID transceiver interrogates for RFID parking tickets purchased from another location in accordance with an exemplary embodiment of the present invention.

As shown in FIG. 15, the process 1500 begins with a portable or mobile RFID transceiver interrogating (1502) for RFID parking tickets purchased from another location, the RFID parking tickets as shown and described in FIG. 4. If a ticket from another location is identified (1504), a parking enforcement officer locates (1506) the vehicle having an RFID parking ticket purchased from another location.

Although the present invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this specification, accompanying drawings, and the claims' equivalents rather than the foregoing description.

What is claimed is:

1. A method of regulating a plurality of parking spaces at a designated parking location, comprising:
    issuing an RFID parking ticket for parking a vehicle in a first parking space of the plurality of parking spaces at the designated parking location, the RFID parking ticket having a corresponding time of expiration and a corresponding parking space identifier;
    sensing that the vehicle is parked in a second parking space of the plurality of parking spaces;
    interrogating the RFID parking ticket in order to determine the time of expiration and the parking space identifier;
    notifying a central server of a parking violation when the time of expiration indicates that the RFID parking ticket has expired; and
    notifying the central server of a parking violation when the parking space identifier does not correspond to the second parking space of the plurality of parking spaces.

2. The method of claim 1, wherein the method is implemented by a kiosk deployed in a publicly accessible area.

3. The method of claim 1, wherein interrogating the RFID parking ticket is implemented by a fixed RFID transceiver.

4. The method of claim 1, wherein interrogating the RFID parking ticket is implemented by a mobile RFID transceiver.

5. The method of claim 1, further comprising accepting a payment for the RFID parking ticket.

6. The method of claim 5, wherein payment is accepted in a payment type selected from the group including a debit card, a credit card, or cash.

7. The method of claim 1, further comprising dispatching a parking enforcement officer to the location associated with the parking violation.

8. The method of claim 1, further comprising:
    sensing that another vehicle is parked in a parking space; and
    notifying the central server if the other vehicle is not associated with an unexpired RFID parking ticket.

9. The method of claim 1, wherein sensing that the vehicle is parked in the second parking space of the plurality of parking spaces further includes using a camera to sense the presence of the vehicle.

10. The method of claim 1, wherein sensing that the vehicle is parked in the second parking space of the plurality of parking spaces further includes using a parked vehicle sensor to sense the presence of the vehicle.

11. The method of claim 1, further comprising receiving payment for a parking violation if it is determined that the RFID parking ticket has expired.

12. An apparatus for regulating a plurality of parking spaces in a designated parking location using RFID parking tickets, the RFID parking tickets having a corresponding time of expiration and a corresponding parking space identifier, comprising:
    a parked vehicle sensor to determine when a vehicle is parked in a parking space of the plurality of parking spaces;
    an RFID transceiver adapted to interrogate an issued RFID parking ticket associated with the vehicle parked in the parking space in order to determine an expired RFID parking ticket using the corresponding time of expiration and determine a reused RFID parking ticket from another parking space of the plurality of parking spaces using the parking space identifier; and
    a connection to a central server adapted to notify the central server of the determination of the expired RFID parking ticket and of the reused RFID parking ticket.

13. The apparatus of claim 12, wherein the apparatus is a kiosk deployed in a publicly accessible area.

14. The apparatus of claim 13, wherein the RFID transceiver is fixed.

15. The apparatus of claim 12, wherein the RFID transceiver is mobile.

16. The apparatus of claim 12, further comprising a payment acceptor adapted to accept payment for the RFID parking tickets.

17. The apparatus of claim 16, wherein payment is accepted in a payment type selected from the group including a debit card, a credit card, or cash.

18. The apparatus of claim 12, wherein the connection to the central server if further adapted to notify the central server if the sensed vehicle is not associated with an RFID parking ticket.

19. The apparatus of claim 12, wherein the parked vehicle sensor is selected from a group including a camera, a proximity sensor and an optical sensor.

20. The apparatus of claim 12, further comprising a payment acceptor adapted to accept payment for receiving payment for a parking violation.

* * * * *

UNITED STATES PATENT AND TRADEMARK OFFICE
CERTIFICATE OF CORRECTION

PATENT NO.       : 7,424,968 B2                                     Page 1 of 1
APPLICATION NO.  : 11/212269
DATED            : September 16, 2008
INVENTOR(S)      : Meyerhofer et al.

It is certified that error appears in the above-identified patent and that said Letters Patent is hereby corrected as shown below:

COLUMN 5:
    Line 28, "server," should read -- server --.

COLUMN 6:
    Line 25, "is coupled is coupled" should read -- is coupled --.

COLUMN 8:
    Line 50, "identity" should read -- identity of --.

COLUMN 9:
    Line 6, "with" should read -- within --; and
    Line 64, "where upon" should read -- whereupon --.

COLUMN 14:
    Line 56, "if further" should read -- is further --.

Signed and Sealed this

Thirteenth Day of January, 2009

JON W. DUDAS
*Director of the United States Patent and Trademark Office*